United States Patent
Weisgerber (10) Patent No.: US 9,274,403 B2
(45) Date of Patent: Mar. 1, 2016

(54) METHOD FOR SELECTIVELY IMPARTING A CINEMATIC APPEARANCE TO MOTION PICTURES PHOTOGRAPHED AND EXHIBITED AT HIGH FRAME RATES

(71) Applicant: Robert C. Weisgerber, New York, NY (US)

(72) Inventor: Robert C. Weisgerber, New York, NY (US)

( * ) Notice: Subject to any disclaimer, the term of this patent is extended or adjusted under 35 U.S.C. 154(b) by 259 days.

(21) Appl. No.: 13/815,629

(22) Filed: Mar. 13, 2013

(65) Prior Publication Data

US 2014/0268061 A1    Sep. 18, 2014

(51) Int. Cl.
| | |
|---|---|
| G03B 15/00 | (2006.01) |
| G02B 27/22 | (2006.01) |
| H04N 5/253 | (2006.01) |
| G03B 21/32 | (2006.01) |
| G03B 27/00 | (2006.01) |
| H04N 5/232 | (2006.01) |
| H04N 5/262 | (2006.01) |

(52) U.S. Cl.
CPC ............ G03B 15/00 (2013.01); G02B 27/2214 (2013.01); G03B 21/32 (2013.01); G03B 27/00 (2013.01); H04N 5/23229 (2013.01); H04N 5/253 (2013.01); H04N 5/262 (2013.01)

(58) Field of Classification Search
USPC .................. 352/40, 44; 348/97–106
See application file for complete search history.

(56) References Cited

U.S. PATENT DOCUMENTS

| | | | |
|---|---|---|---|
| 7,755,678 B2 * | 7/2010 | Goris et al. ................... | 348/239 |
| 2005/0259179 A1 * | 11/2005 | Robertson et al. ............ | 348/367 |
| 2012/0062845 A1 * | 3/2012 | Davis et al. ..................... | 352/45 |
| 2013/0038693 A1 * | 2/2013 | Tchoukaleysky ............... | 348/46 |

* cited by examiner

*Primary Examiner* — William C Dowling
(74) *Attorney, Agent, or Firm* — David Peter Alan (57) ABSTRACT

A method is disclosed whereby motion pictures photographed and exhibited at high frame rates, typically 48 frames-per-second, are modified to impart a cinematic appearance which tempers the level of motion detail inherent at such high frame rates. Motion pictures can be photographed either on film or by digital means. A controlled amount of motion blur is imparted selectively to certain scenes, sequences, frames or components of images. This can be accomplished by using different shutter angles for digital photography, or by imparting motion blur in post-production. The result is a motion picture that provides viewers with a cinematic appearance while at the same time, retains the spatial and temporal resolution of HFR, due to the high frame rate of photography and exhibition.

11 Claims, 2 Drawing Sheets

FIG. 1

FIG. 2

METHOD FOR SELECTIVELY IMPARTING A CINEMATIC APPEARANCE TO MOTION PICTURES PHOTOGRAPHED AND EXHIBITED AT HIGH FRAME RATES

FIELD OF THE INVENTION

This invention relates to motion pictures photographed on film or by digital means, at high frame rates and projected at the same frame rates, whereby the invention mitigates excessive motion detail by the selective and controlled impartation of motion blur. The benefit of this alteration is to allow the producer to control the cinematic appearance of the motion picture, thereby improving its entertainment value to the audience viewing it. This treatment can either be accomplished during photography or later, during post-production.

BACKGROUND OF THE INVENTION

"Seeing is believing" is an old saying. In the cinematic art, an important component of the experience is the knowledge that the viewer is watching a motion picture, rather than "real-life" experience as it actually occurs. Historically, motion blur was an artifact of film photography and production at 24 frames per second, but it helped smooth out the apparent transition between each frame and the next, and reduced the amount of overall detail. This reduced detail that was part of the cinematic experience. Today, however, digitally-photographed images or photochemical images on film, at a high frame rates (HFR) such as 48 frames per second, do not include the same amount of motion blur as seen in conventional movies at 24 frames per second. Instead, they often present a hyper-realistic appearance that approximates the "soap opera" look associated with live television. While it may be advantageous to present a motion picture that has a realistic appearance, too much realism in a presentation can detract from the experience of viewing a movie. The producer would prefer to deliver a product of the cinematic art, rather than an experience that replicates the "soap opera" look of live television at all times. In the practice of the invention, this can be accomplished on a scene-by-scene basis, either through photography or post-production. It can also be accomplished frame-by-frame, or at the level of treating specific components of images, during post-production.

With the advent of HFR photography and projection, the appearance of a theatrical motion picture can approach that presented on live television in real time, especially as frame rate increases and projected images look less cinematic and more lifelike. Viewers must "suspend disbelief" to some extent in order to enjoy any cinematic experience. However, the more realistic an image appears, the more difficult it is to execute the suspension of disbelief that is essential to the optimal enjoyment of a motion picture experience. With the use of higher frame rates for photography and presentation, there is greater clarity than at 24 frames per second, but there is so much detail in some scenes that the increased clarity can work against the experience by distracting the audience away from the story line. In the practice of this invention, the amount of realism can become variable, under the control of the producer, who can use it as a creative tool. With this invention, it is now possible to modulate the amount of realism that an audience perceives at any time during the showing of a motion picture, which brings it under the control of the producer in a manner that has not been accomplished before.

Suspension of disbelief is an integral part of the moviegoing experience. The combination of the limitations of film photography, particularly at the conventional frame rate of 24 frames per second, induces the viewer to believe that, because he or she is watching a motion picture, the action portrayed could possibly occur; although the viewer knows that it did not necessarily happen in actuality. Enjoying a motion picture is a conditioned experience, and it is the producer's task to deliver an experience to the audience that reminds them that the action they see is not an event that is happening now. It could be a fantasy or a historic event, but it is not happening at the moment they are viewing the motion picture. The invention described here furthers this goal. With contemporary acquisition methods, a producer is no longer saddled with artifacts that heretofore had to be accepted. Now, with higher frame rates, there are expanded creative opportunities, and this invention allows those opportunities to be fulfilled. The present invention improves spatial and temporal resolution, while providing creative flexibility by allowing an artifact of 24-frame-per-second photography and exhibition to be modulated in motion pictures photographed and exhibited at high frame rates.

Throughout the Twentieth Century, advances in cinema technology have contributed to making theatrical feature film presentation more lifelike. Cinerama, introduced in 1952, delivered an immersive impression not seen before. One of the factors was the use of a new frame rate; 26 frames-per-second. Later, the Todd-AO 70 mm system captured and projected images at 30 frames per second and produced a noticeable improvement in perceived realism. Showscan, at 60 frames per second, mitigated the artifacts of 24-frame-per-second presentation even more, with a significantly higher frame rate, but its use was limited to special-venue applications.

Filmmakers learned early in the development of the medium that too much realism was not desirable, however. An early Edison film of a train coming toward the camera, photographed at 48 frames-per-second, scared that audience. They were afraid that the train on the screen would run over them.

While contemporary audiences in motion picture theaters are more sophisticated than that, the negative effects of an inordinately realistic presentation have been highlighted by the recent release of Peter Jackson's The Hobbit: An Unexpected Journey at 48 frames-per-second and in 3D, the first commercial motion picture released at that frame rate. Technical reviews of the picture in industry trade publications were not enthusiastic, because of the overly realistic presentation. Based on a ten-minute preview screened at 48 frames-per-second, Jim Vejvoda, Executive Editor of IGN Movies, said on www.ign.com on Apr. 24, 2012: "In this reporter's opinion, it looks like live television in hi-def video. And it didn't look particularly good. Yes, this is shocking, but I was actually let down by the Hobbit footage, as were a number of the other journalists I spoke with afterward . . . . While 48 fps may create a more realistic 'you are there' picture quality, it actually works against The Hobbit from the 10 minutes of footage we saw. This undeniable 'reality' kept pulling me out of the movie rather than immersing me fully into its world." Peter Scieretta posted on www.slashfilm.com on the same day that the character-centric scenes at 48-fps appeared "jarring" and added "It looked uncompromisingly real—so much so that it looked fake."

If the opinions of industry commentators are any indication of the potential impact of motion pictures released at 48 frames-per-second, the problem which the present invention solves could cause high-frame-rate motion pictures generally to fail in their objective of providing an improved experience for contemporary moviegoers. While undesirable artifacts will always detract from the enjoyment of a cinema experience, there are other cues that remind viewers that they are watching a motion picture, and not a television program. By introducing a controlled amount of an otherwise-undesirable artifact, the present invention moves the theatrical motion picture experience away from the hyper-realistic look that prompted negative reviews of The Hobbit. That controlled "artifact" is motion blur, which can be added, even at high frame rates, in the practice of this invention. The purpose of selectively blurring motion is to reduce the level of detail inherent in rapid motion, which can interfere with the advancement of the story line of a motion picture, by absorbing the audience with superfluous visual detail to the extent that they fail to notice other image components which are vital to advancing the action.

The invention described here optimizes theatrical motion picture realism by bringing the impression of reality the highest possible level, without going so far as to deliver the "soap opera" look; the appearance associated with live television, which can be distracting. The term came from the early days of television, when soap operas were broadcast live, and U.S. television used 30 frames and 60 interlaced fields (other countries had similar interlaced transmission methods). In the U.S., this meant that 60 fields were presented to viewers every second, while only 24 frames are displayed in motion picture theaters. Compared to traditional motion pictures, television appears significantly more realistic. This hyper-realism is similar to the experience which the viewers of The Hobbit had. In other words, the practice of the present invention retains a certain level of cinematic appearance and avoids this distraction, while still delivering a superior quality motion picture presentation. This is accomplished by imparting an optimal amount of motion blur, which was historically considered an artifact of film photography and presentation at the conventional frame rate of 24 frames per second.

Much of the history of the development of motion picture technology has been driven by the desire to improve the perception of realism and clarity of the presentation viewed by motion picture audiences. This has been an object of all inventions that featured higher frame rates, larger film formats, larger screens and digital image capture and presentation methods. The inventor here has also taught such methods to improve cinematic motion picture presentation: e.g. Weisgerber: U.S. Pat. No. 5,627,614 (presentation at forty-eight frames per second of film sequences photographed at that rate or at the conventional rate of twenty-four frames per second and double-frame printed).

The previous Weisgerber invention is one of many that improved the quality of motion picture presentation over the course of the last Century. With digital cinematography, producers now have the ability to vary shutter speed or shutter angle without being restricted by film transport requirements. With conventional film transports, the shutter could only be opened to a limited degree with a typical motion picture film camera. The conventional frame rate of 24 frames per second was equivalent to a 180° shutter angle, while 48 frames per second was equivalent to a 90° shutter angle. These limitations are not present in digital photography, so motion blur is now variable, under the control of the producer. With digital photography, it is possible to vary the shutter from essentially fully open to essentially fully closed. In other words, it is possible to vary the shutter speed to the equivalent of any shutter angle, because there is essentially no blanking time, which was required to move the film between frames. Motion blur, the cinematic artifact that prompts the viewers to suspend disbelief, is not present with digital photography at a high frame rate. Without it, a motion picture looks too much like live television, and not enough like the product of cinematic art. The present invention imparts motion blur selectively when desired for a cinematic look, while retaining the capacity to employ the enhanced image quality available through digital HFR photography when highly-realistic, immersive images are desired. In other words, the primary object of the invention described here is to produce enhanced images, but not so realistic that they provide a level of detail which would detract from the viewer's movie-going experience.

A part of the cinema art is the presentation of images which incorporate "artifacts" that are a component of 24 frame-per-second film presentation, and that remind the viewers that they are, indeed, watching a film. Some of these artifacts, especially motion blur, are associated with the conventional frame rate of 24 frames per second. This delivers the "cinematic" look associated with "legacy" motion pictures, which is considered part of the experience of watching a film in a theatrical setting. This motion blur is accepted by the movie-going public, and is not viewed as a disturbing phenomenon. In fact, motion blur is a natural phenomenon; a part of the actual visual experience, in real life.

High-frame-rate image capture and presentation methods suppress artifacts associated with a "cinematic" appearance or "legacy" look to the extent that viewers cannot perceive them. Presentation of forty-eight discrete images per second, as taught previously by Weisgerber in U.S. Pat. No. 5,627,614 suppresses these artifacts associated with a low frame rate. While an enhanced presentation is generally desirable for motion pictures as a whole, it is not desirable that all content be enhanced to such a high standard that a motion picture loses all of its cinematic appearance. This invention gives the producer the creative option to decide how realistic, or how hyper-realistic, any segment of motion picture content should appear. For example, a close-up of a character's face in sharp focus can present too much detail to deliver a pleasing image to the viewer, when displayed on a large screen. The smoothness of motion available at high frame rates of presentation actually detracts from the viewer's experience, in that case. In another example, contemporary image-capture methods produce sufficient depth of field that the entire image is in sharp focus. This is a desirable feature when the background is a scenic outdoor vista or during an action scene, but it is not desirable for an indoor scene where the characters are engaging in a serious conversation and the dialog is more important than the visual information. In such scenes, it is esthetically desirable to keep the characters in focus and bring the background slightly out of focus; a result that cannot be achieved with current digital photography. By adding a controlled amount of motion blur, a producer can create these desirable effects by reducing the amount of excessive detail in moving objects. In those cases, it is necessary to impart an artifact in post-production to selected scenes, despite the fact that artifact may otherwise be considered undesirable. The present invention can mitigate hyper-realism by blurring excess detail, which prevents such detail from distracting the viewers of a motion picture. In effect, motion pictures produced according to this invention can have the "legacy" look of a classic film, a highly-realistic look, or anything in between. In addition, the amount of realism that is delivered to an audience in a motion picture theater can now be varied, under the control of the producer of the motion picture.

The effect produced in the practice of this invention would be especially noticeable on today's large screens, where viewers can see more detail than they could on screens typically used in the past. The invention described here has been installed for demonstration purposes in a commercial motion picture theater with a 60-foot screen. Other theaters have screens up to 90 feet wide. In venues such as these, contemporary audiences can easily discern the difference between a cinematic appearance, as opposed to that of a television broadcast of an event as it takes place.

As the motion picture industry begins to embrace 48 frames-per-second or higher as frame rates for photography and exhibition of new motion pictures, this drawback of high-frame-rate exhibition is becoming apparent. The recent release of Peter Jackson's version of The Hobbit: An Unexpected journey at 48 frames-per-second and in 3D, is a case in point. On Apr. 28, 2012, before The Hobbit was released and only portions of it were screened in previews, Anthony Wing Kosner wrote in Forbes Magazine that "If the frame rate turns out to be a major point of criticism, it will not be a good sign." After the picture was released and viewers' reactions were noted, Ben Fritz reported in the Los Angeles Times on Dec. 7, 2012 that some viewers "have complained, saying that it is too realistic, making 'The Hobbit' seem less like a film and more like something you might see on a high-definition TV or on a video game." Fritz also reported that the trade paper Variety said it was "like watching a high-end home movie."

These differences are critical, as the experience with the release of The Hobbit demonstrated. While there was no dispute that the 48-fps frame rate delivers a highly realistic appearance, audiences and reviewers did not always give positive reviews to that aspect of the production. The subject matter of the motion picture came from the fantasy novels of J. R. R. Tolkein. The extreme appearance of reality in the motion picture as presented did not comport with the audience expectation of a motion picture with a story line based on fantasy.

Fritz quoted Avatar producer Joe Landau as referring to new tools like the 48-fps frame rate and saying: "It's about learning how to take these new tools and still give a cinematic look and feel" to viewers watching motion pictures in these new formats and frame rates. The invention described here solves that specific problem. The invention can take the overly-realistic scenes or shots at 48 frames-per-second and give them a more "cinematic" appearance, which tones down the hyper-realism that audiences saw in The Hobbit and that was the object of the complaints quoted here.

It is not the object of this invention to give the appearance of 24-frame-per-second photography for an entire motion picture. Instead, the method described here is used selectively, only to temper the excessive appearance of detail in motion that can result from the temporal resolution inherent at high frame rates, such as 48 frames-per-second, and is inconsistent with a traditional cinematic appearance. Many of the benefits of HFR photography and exhibition, such as a high level of spatial resolution and the ability to employ large screens with minimized artifacts, are desirable. The method described here is used selectively, only to temper an undesirable effect that sometimes occurs with high temporal resolution (an appearance similar to live television; "soap-opera look"), especially on shots containing action occurring in the foreground or at medium-range.

By selectively adding motion blur to a motion picture that was photographed by digital means at a high frame rate like 48 frames-per-second, the present invention produces an optimal experience; more realistic than conventional film photography can produce, yet not as realistic-looking as live television or the appearance of The Hobbit. Thus, the present invention retains an important feature of the cinema experience, while increasing realism to the optimal level, but not beyond it. In this way, "suspension of disbelief" by the viewers of motion pictures produced according to this invention becomes a variable, which is now brought under the control of the producer of the motion picture and harnessed for the improvement of the movie-going experience.

BRIEF DESCRIPTION OF THE INVENTION

The act of suspending disbelief is at the core of the theatrical experience. The art of optimizing the quality of a theatrical motion picture experience involves balancing the audience's perception of realism against artifacts which prompt that audience to suspend disbelief. In the practice of this invention, a producer can use a high frame rate such as 48 frames-per-second to impart a more realistic appearance to a scene or sequence of a motion picture, or even a component of an image, compared to conventional cinema presentation. That producer can also impart motion blur on a selective basis, and in controlled amounts, to deliver a more "cinematic" look in other scenes or sequences, or to other image components, which would encourage the audience to suspend disbelief and enjoy the moviegoing experience more fully than a motion picture that is excessively hyper-realistic would allow.

Motion blur can be imparted as part of photography at a high frame rate, specifically 48 frames-per-second in the preferred embodiment of the invention. In that way, some scenes are photographed in a manner that imparts more motion blur than would be seen in other scenes and sequences, which are photographed differently. Another method of imparting motion blur is on post-production, where it can be added to certain frames, or to certain image components within a sequence of frames. The variability of shutter angle on photography, which is a part of the present invention, helps maintain the integrity of spatial resolution of high-frame-rate presenttion.

In standard film photography at 24 frames per second, the shutter is open to receive light for half of the cycle (180°) and closed for the other half of the cycle, to allow for film pull-down between frames. With digital photography, this constraint does not exist. The shutter speed, comparable to shuttle angle in film photography, is continuously variable; the camera can collect light from almost zero to 360 degrees. A digitally-captured series of images photographed at 48 frames per second can deliver too much realism for a viewer to perceive comfortably. By variably imparting a certain amount of motion blur, this amount of realism can be modulated.

Because of the persistence of vision, a natural phenomenon, traditional film photography and projection at twenty-four frames per second does not produce an optimal experience for a viewer. At that frame rate, artifacts reduce image quality, rendering it sub-optimal. Weisgerber has taught the use of higher frame rates, especially forty-eight frames per second, to improve the temporal and spatial characteristics of a film. However, with the amount of detail now available through digital image capture, this technique can cause an opposite problem by imparting too much temporal detail in a motion picture to deliver an optimal theatrical experience. The invention described here utilizes a high rate of image-capture, but adds motion blur to mitigate the level of realism experienced by the viewer of a motion-picture, thus delivering an improved theatrical motion picture experience.

The invention begins with digitally-captured high-frame-rate cinematic images, or images photographed on film, typically in a 35 mm format. Motion pictures are photographed at 48 frames per second in the preferred embodiment, using a technique that imparts a certain amount of motion blur in a controlled manner. This is a new and creative use for motion blur, which was often considered an inherent artifact of photography, when it could not be controlled. By imparting motion blur in a controlled manner, it is possible to avoid the "soap opera" look associated with live television, while retaining a more realistic appearance than a conventional cinema presentation can deliver. The high frame rate used in this invention also delivers a level of clarity of image and spatial resolution not available at the conventional frame rate of 24 frames-per-second. In addition, the degree of realism delivered to the viewers can be varied under the producer's control in the practice of the invention, which allows the producer to determine the overall quality of the motion picture experience, as scenes or sequences change.

In the practice of the invention, motion picture scenes or sequences are photographed on film or by digital means at a high frame rate; forty-eight images per second or higher in the preferred embodiment. The resulting images deliver an excessively-realistic impression when exhibited to audiences, so the motion picture is photographed in a manner that imparts motion blur as a means of controlling that look. This tempers the hyper-realistic impression, to the extent that the producer desires, for any component of the entire motion picture. Alternatively, motion blur can be imparted during post-production. For example, the method described can take excessively-detailed specific motion in a shot and make it blurrier, so it would not distract the audience from concentrating on the general impression of the overall appearance, which is more important at that moment.

It is an object of this invention to present highly-realistic images captured at 48 frames per second or higher, as well as cinematic-looking images with imparted motion blur. In the practice of the invention, a producer can impart any amount of motion blur desired, thus making motion blur a variable quantity that can be modulated. With motion blur as a part of creative control, certain portions of a motion picture can be made to present vivid detail. In others, details that the viewers do not need to see, based on the producer's artistic discretion, can be obscured. A motion picture that is excessively realistic throughout the entire presentation, with no break for less-realistic scenes, may cause stress in viewers and detract from the overall moviegoing experience. Under such circumstances, viewers can experience motion sickness or feel as if the room is spinning. The invention described here prevents the possibility of such overload, when desired.

In the practice of this invention, images can be captured for maximum clarity and realism, when that is desired as part of advancing the story line of a motion picture. However, that level of intensity is not always required with this invention. As shall be demonstrated, with a continuously variable shutter speed on digital image capture, or with digital post-production tools calibrated in a similar manner and, the images presented to audiences can be highly realistic, cinematic-looking, or appearing to possess any level of realism in between. That level of realism can be varied scene by scene, or sequence by sequence, depending on the nature of the action occurring in the motion picture. It can even be varied frame by frame or for only selected image components, by adding motion blur during post-production.

BRIEF DESCRIPTION OF THE DRAWING

The present invention expands the range of control of the producer or director of photography of motion pictures, and FIG. 2 is a flow chart that shows some of the decisions that the user of the invention can make in its practice. These decisions concern the amount of motion blur enhancement, if any, that is imparted to motion-picture images in the practice of this invention, in order to improve the HFR presentation. The first is the shutter angle at which the camera is set during photography or post-production, when tools are set for previously-captured images. In either case, the invention imparts a precisely-desired amount of motion blur, calibrated to shutter angle. Although certain shutter angles lend themselves to certain types of shots, any shutter angle is suitable, as long as it is appropriate to discipline temporal resolution. The second decision is the duration of the use of such shutter angle, whether for a shot, a sequence, or for an entire scene.

In addition, if previously-captured images are treated in post-production in the practice of the invention, it is also feasible to impart a desired amount of motion blur to a single frame, or to selected components of a single frame. That particular decision is not depicted, but the flexibility is the same as in the case of applying the invention to photography.

DETAILED DESCRIPTION OF THE INVENTION

The object of this invention is to deliver to theatrical motion picture audiences an enhanced experience that appears more realistic, both spatially and temporally, than conventional film or digital photography at 24 frames per second can deliver; yet not as realistic as the "soap opera" appearance of live television. An optimal amount of realism in a motion picture can be obtained by increasing the frame rate; for example to 48 frames per second for photography and projection, and by adding an appropriate amount of motion blur to temper the hyper-realism that the audience would otherwise see as a product of exhibition at that frame rate, as the producer of the motion picture desires.

Conventional film image capture and projection at 24 frames per second suffers from several artifacts, of which motion blur is only one. With film photography, light reaches the film for only half of the time and the shutter on the camera is closed for the other half. The required shutter opening time (approximately 1/48 of a second) causes a reduction in motion detail. The amount of motion blur in such shots is inherent in the action being photographed, and cannot be changed under normal circumstances. A higher frame rate, such as 48 frames-per second, reduces motion blur, along with reducing judder and strobing. Some artifacts can be particularly onerous at 24 frames per second, such as the spokes of wagon wheels appearing to rotate backwards (counterclockwise), while the wagon is obviously moving forward. Directors have used certain artistic techniques to mitigate these artifacts, such as camera angles, panning with the action, and having actors walk in a certain direction that mitigates the effects of motion artifacts. Still, these artifacts are part of 24-frame-per-second photography and projection. They are reduced through the use of photography and projection at higher frame rates such as 48 frames per second. This occurs because a new image is captured twice as often. This shorter displacement of each image component between frames in HFR photography and presentation delivers the advantages of eliminating most judder and smoothing out the appearance of motion. Its major drawback is that it distracts viewers from the overall advancement of the story line of the motion picture, or disorients viewers in extreme cases of hyper-realism.

As shall be shown, with digital image capture at the high frame rate of 48 frames-per-second, exposure can be lengthened or shortened to an extent not attainable with film photography at 24 frames per second. With film (to the extent possible) or digital image capture, long exposures have been used for special effects, but the present invention uses them to produce enhanced motion pictures for theatrical exhibition. Varying the shutter speed to control the amount of apparent hyper-realism (the cause of the "soap opera" look of live television) is a novel use. It is also novel to modulate the amount of motion blur that is imparted to images comprising specific scenes or sequences, or even specific frames or image components, as can be accomplished either in photography or post-production. This adds to the creative control of the motion picture producer in the practice of this invention. In short, motion blur becomes a controllable variable, which can be varied continuously. This allows the producer to control temporal resolution, by mitigating a "soap opera" look. Such a highly-realistic appearance is desirable for an outdoor scene or an action scene, but not in a setting where excessive detail in the defining motion detracts from advancing the story line of the picture. For those scenes, the invention imparts an appropriate amount of motion blur during photography or in post-production. This can be done for an entire scene to simulate the "legacy" look of film production at 24 frames per second, or it can be done with selected frames.

In post-production, motion blur can be imparted using CGI software known in the art. Such digital devices are calibrated to correspond to shutter speeds on a film or digital camera. These devices can vary "shutter speed" selectively to generate a desired amount of motion blur. For example, shutter speed can be set to the equivalent of a shutter angle of 90° to cut motion blur in half and comparable to a film camera operating at 48 frames-per-second, compared to the 180° setting commonly associated with film photography at 24 frames per second. Alternatively, it is feasible to screen image sequences in a digital intermediate room, which is typically used for color correction and image adjustments. Now, it is also feasible to add motion blur, in the same setting, to images that have already been photographed at high frame rates, for projection at the same frame rate on large screens.

Weisgerber has previously taught the use of film photography at 24 and 48 frames per second to produce different scenes, or components of images, with two very different appearances (U.S. Pat. No. 5,627,614). Photography at the lower frame rate delivers a conventional cinematic look of legacy films, while photography at the higher frame rate produces a significantly sharper look, free of motion artifacts. Using both frame rates in the same film-based motion picture produced two different cinematic appearances to the viewers of the motion pictures produced according to that invention. This is because the two appearances have different spatial and temporal resolutions. Now, with the ability to add motion blur to motion pictures photographed at 48 frames-per-second or higher, it is possible to treat the images by adding any amount of motion blur desired, so that the amount of spatial and temporal resolution becomes continuously variable in the practice of this invention.

In the previous Weisgerber invention, only two different cinematic appearances were available. This invention provides a degree of creative control that has not previously been available to motion picture producers using film or digital photography, but it now feasible through this invention. Historically, film photography and exhibition yielded two different looks: the "legacy" look of 24 frames per second (equivalent to 180° shutter angle) and the enhanced look of 48 frames per second (equivalent to 90° shutter angle). There was no other appearance available. In that situation, the high-impact experience could only be switched on or off. With this invention, the appearance can be varied continuously, allowing not only the two "film-like" appearances, but also an appearance anywhere between them. This is particularly valuable for variably modulating temporal resolution to produce optimal results, without the constraint of being limited to one of the two appearances associated with film or digital photography and exhibition in the prior art.

An additional benefit of the invention is an impression of dimensionality that is not available under conventional motion picture practice. Digital or film motion pictures photographed at 24 frames per second appear flat. Digital or film photography at 48 frames per second has a dimensional appearance that the slower frame rate does not deliver, due substantially to the lack of motion artifacts at high frame rates, as well as the improvement in spatial and temporal resolution. While photography and exhibition at the higher frame rate does not, in itself, replicate the true three-dimensional effect delivered by 3D techniques, it also does not require the special formats of 3D image storage or the polarizing or other special glasses that viewers must wear during the presentation to obtain the desired effect. The dimensionality seen in high frame rate presentation is a natural effect that is delivered in the practice of the invention, and it constitutes an improvement over conventional cinematic practice. The present invention also avoids the undesirable artifacts of 3D presentation, such as poor contrast, strobing and judder.

Previous Weisgerber inventions optimized the amount of realism available through film photography, specifically at forty-eight frames per second, or other high frame rates (U.S. Pat. Nos. 5,627,614 and 5,739,894). While this technique created a significant improvement in realism over conventional cinematic art, it required alternating between two different appearances: the traditional "film" look of 24-frame-per-second photography and exhibition, and the more realistic appearance available at 48 frames-per-second. With film photography and projection, there was no other choice. Weisgerber 614 demonstrated the potential for 48-frame-per-second film photography and exhibition to deliver a highly-realistic image, as previewed and reported by Barbara Whitaker of the New York *Times* on Jun. 10, 2002. Whitaker said that the demonstration film included "a carriage ride through Central Park and a stomach-churning journey through the Grand Canyon." In the October, 2000 issue of *ICG Magazine*, published by the International Cinematographers' Guild, Editor-in-Chief George Spiro Dibie called the previous Weisgerber invention "literally breathtaking" and "an uplifting glimpse of one potential path to the future." The present invention goes further and allows the producer to choose between delivering a highly-realistic image, or one with a cinematic appearance.

The present invention delivers further improvement available through digital means, because digital exposure duration is continuously variable. While the preferred embodiment of the invention uses digital photography at 48 frames-per-second or more, it is also possible to photograph film images at the same frame rate and convert them to digital images by means known in the art. Then the benefits of the invention can be realized by adding an appropriate amount of motion blur on post-production.

The amount of motion blur imparted to images can be considered as a function of shutter speed; the digital equivalent of the shutter angle in film photography. In conventional film photography at 24 frames per second, the shutter is normally open for 180° and closed for the other 180°. For film photography at 48 frames per second, the shutter is only open for 90° and closed for the other 270° of the cycle, while twice as many images are photographed every second. Terminology from film photography is useful for explaining analogous digital photography, in the practice of this invention.

The exposure time can be calculated with a formula. In the practice of the invention, exposure time (designated X) is expressed as the shutter angle for which the camera is set (SA), divided by the product of 360 times the frame rate (FR), or X=SA/(360)(FR). Using the basic setup with 180° for the shutter angle and the conventional frame rate of 24 frames per second, X=180/(360)(24), or ⅟48. Thus, shooting at 24 frames per second with a 180° shutter (shutter open for 180° of the entire 360° of the cycle, of half of the available time) results in an exposure time of ⅟48 of one second, which can be rounded to ⅟50 of one second. This is in accord with conventional film photography. Demonstration tests at this shutter angle produced image sequences with sufficient motion blur that they resemble conventional film photography at 24 frames per second, although other artifacts (such as grain, strobing and judder) associated with 24-fps film photography, are not present with digital photography.

As can be seen, the maximum exposure time for digital motion pictures to be presented at 48 frames per second, with essentially no shutter closure, also approaches ⅟48 of a second. Using 358° of opening (only 2° of blanking time between images) X=358/(360)(48)=0.0207 second. This is only slightly more than ⅟50 of one second, within rounding error of the exposure time for 24 frames per second with the shutter angle set at 180°. This also replicates essentially the amount of motion blur associated with film photography at 24 frames per second, although images are captured digitally at 48 frames per second. In essence, the blanking time required for film photography at 24 frames per second was used instead to capture twice as many images digitally at double the frame rate.

For a 48 frame-per-second capture rate and the shutter set at 180°, the exposure time would be X=180/(360)(48)=⅟96 of one second; essentially half the exposure time, compared to the previous example. This setting provides a sharper image, with less motion blur, due to the higher shutter speed, which reduces exposure time.

To replicate the look of film photography at 48 frames per second with a 90° shutter, the exposure time is, X=90/(360)(48) or ⅟192 of one second. With the shutter angle (in the numerator of the expression) cut in half and the frame rate (in the denominator of the expression) doubled, it is clear that the exposure time would be one fourth of the time employed in the first example. As exposure time is reduced, by increasing the shutter speed and by increasing the frame rate, the appearance of the resulting digitally-photographed motion picture approaches that of live television, which can result in scenes that appear too realistic for theatrical motion picture presentation, unless such a realistic appearance is desired for a specific scene or sequence. The invention described tempers this degree of realism by imparting an appropriate amount of motion blur, when desired to improve the viewer's experience.

As shown, adding motion blur to digitally-captured images essentially imitates traditional film photography. Film image-capture at 24 frames per second involves a 180° shutter setting and exposure for ⅟48 of one second. To impart motion blur to digitally-captured images, each image is exposed for ⅟48 of one second, but exposure continues for essentially that entire time. There is no dark time, except the minimum needed between frames (as little as two degrees out of 360). Because a quick-charging and discharging charge coupled device (CCD) is used as part of the camera, it is feasible to maintain exposure for essentially the entire cycle. Other imaging devices that produce the same results are also suitable for the practice of the invention. For example, a CMOS Bayer sensor would also be suitable for this invention. Maximizing exposure time as a percentage of the image cycle also maximizes the amount of motion blur imparted to the image. In other words, the longer the exposure time, the more motion that can be captured while the shutter is open to photograph an image, so the more motion blur.

The use of certain camera settings to capture a highly-realistic image, or to induce a desired amount of motion blur, is straightforward. For a sharp image at 48 frames per second, a camera set at 90° replicates the look of film photography at 48 frames per second, or less for even more sharply-defined image. For maximum motion blur, the shutter should be set "fully open" to allow as much exposure as possible. In fact, it is not feasible to allow light to illuminate the digital collecting device for 100% or the time, or the entire 360° of an image cycle. There must be some dark time between images, so they can remain separate. Still, such dark time is minimal, and exposure can proceed for the time equivalent to 358° of the cycle. This replicates the significant motion blur artifact present in film photography and presentation at 24 frames-per-second, and also diminishes the spatial and temporal resolution normally associated with the higher frame rate, under certain conditions. Any amount of exposure between 90° and maximum, such as equivalent of 180°, 225° or 270°, can also be used to impart an intermediate amount of motion blur, so the amount of motion blur imparted can be varied continuously. This also applies to settings of less than 90°. The variability of the shutter angle in photography helps to maintain the integrity of spatial resolution in high-frame-rate photography.

A shutter speed equivalent to 90° of shutter angle was chosen as optimal for a sharp image, because it is equivalent to film photography at 48 frames per second. Weisgerber demonstrated that this frame rate provides a superior image, compared to conventional film photography at 24 frames per second, in his previous invention (U.S. Pat. No. 5,627,614). The 90° setting allows sufficient light to reach the light-collecting device to avoid underexposure. Exposure times equivalent to more acute shutter angles (less exposure time) can also be used, if there is enough light, or for special effects. There is no minimum exposure time in the practice of the invention, as long as enough light can be captured to register a recognizable image of sufficient quality. In the practice of the invention, greater or less exposure than any reference point can be used to achieve optimal results, as long as that amount of exposure time is feasible.

In Weisgerber's previous film-based inventions, the smoothness of the transition between 24 and 48 frames per second was limited, because film cameras are locked into only two appearances; either 24 frames per second, or 48 frames per second. Other frame rates have been used occasionally, such as 26 fps in Cinerama and 30 fps in Todd/AO, but it is difficult to execute them. In this invention, a significantly smoother transition can be accomplished, because the amount of motion blur imparted to the digital images can be varied continuously. As a result, the appearance of the motion picture to the audience can also be varied continuously.

In the practice of the invention, different shutter angles lend themselves to different types of shots. For example, for shots of distant objects (equivalent to focusing a camera at infinity, with no foreground objects), sharp images are essential, because the scene itself carries visual impact for the viewers of the motion picture. These shots have high dynamic range. A shutter angle of 90° simulates film photography at 48 frames per second, which has been demonstrated to improve visual impact. Therefore, shutter angles of 90° to 180° or sometimes less than 90 degrees, are best suited for these shots. Larger shutter angles, from 180° to 270°, are suitable for medium-range shots. For close-ups with action, as opposed to stationary objects, the shutter angle should be set to approach continuously open, from 270° to as close to continuous as 358°. The latter range simulates the "cinematic" look of film photography at 24 frames per second, by imparting the amount of motion blur associated with it, or almost that amount of motion blur. Varying shutter speeds, depending on the type of shot desired, is an integral and novel feature of this invention. This invention does not preclude the cinematographer from using their other tools, such as star filters, diffusion filters, and the like. Instead, it adds another tool for optimizing the impact of a motion picture on its viewers.

Figure 1:
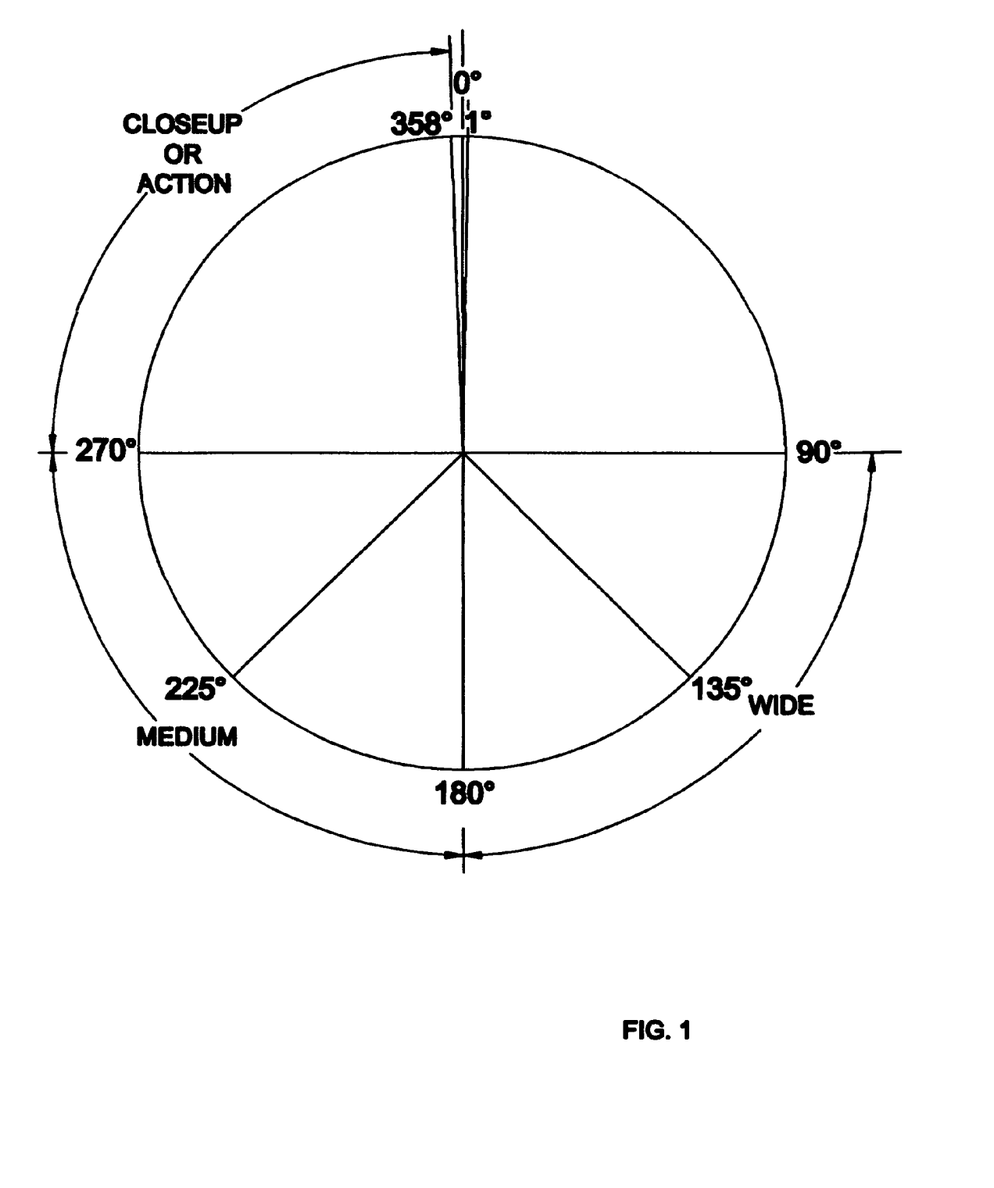
FIG. 1 is a graphic representation of the amount of time duration of a motion picture image as photographed by digital means, with the time for photographing a single image represented as a circle. The circle contains an angular representation of the shutter speed; the proportion of the time that the shutter is open, so that image is being captured during the cycle of one image, from very briefly to almost continuously. The drawing contains lines corresponding to certain angular equivalents to shutter speed, as well as preferred ranges for certain types of shots.

These ranges can be seen in FIG. 1, represented as sectors of a circle. The circle represents all of the available time for exposure of a digitally-captured image, after the previous image and before the next image. For this discussion, it is assumed that digital photography is used at the frame rate of 48 frames per second, which is the preferred embodiment of the invention. If exposure continues for ⅟₄₈ of one second, as is consistent with Weisgerber's previous inventions for film photography, the increase in the angle subtended during the cycle (from zero to 360°) is equivalent to the opening of the shutter on a film camera, which theoretically (although not in practice) can range from closed (zero) to always open (nearly 360°). This is not attainable in actual practice with film photography, where shutter opening is limited to about 200°. In the practice of the invention described here, a shutter angle approaching fully open delivers the amount of motion blur consistent with 24 frame-per-second film photography, while a shutter angle of 90° delivers the amount of motion blur consistent with 48 frame-per-second film photography. These shutter angles alone do not provide for the greatest effect in high-frame-rate photography in which controlling hyper-realism or the "soap opera" look is critical; they are used only as examples.

Referring to FIG. 1, the radial line 0 extending to the top of the circle depicts the equivalent of the shutter fully closed (dark time). Radial line 1, immediately clockwise from radial line 0, shows the equivalent of a minimal amount of light being allowed into the camera. Radial line 90, moving clockwise 90°, represents the equivalent of the shutter opening for an optimally-sharp image. Moving clockwise from that point, other lines depict equivalents of amounts of exposure duration that impart different amount of motion blur into the images captured at those settings. Radial line 135 is equivalent to the shutter being open three-eighths of the time, and radial line 180 is equivalent to a shutter open for half of the time (180° of the cycle). Radial line 225 depicts an exposure time that imparts more motion blur; equivalent to a shutter angle of 225°, and radial line 270 is equivalent to the shutter being open three-quarters of the time, for a high level of imparted motion blur. These settings deliver an amount of motion blur that is more than the amount associated with 48 frame-per-second film photography and less than film photography at 24 frames per second. Finally, radial line 358 is the equivalent to a shutter open for 358° of the cycle, which delivers the amount of motion blur consistent with film photography at 24 frames per second. This is maximum motion blur; twice the number of frames for twice as long. The latter setting is almost equivalent to exposure for the entire image cycle, and such exposure duration is limited only by the need for the image-capture device to maintain very brief blanking between images to maintain a minimal amount of temporal separation between them. At this setting, the maximum amount of motion blur is imparted to images as they are photographed. The circle shown in FIG. 1 demonstrates that the amount of motion blur which can be imparted to an image as photographed is continuously-variable over nearly the entire angular range. It has been found that these settings are optimal for controlling motion blur, as well as providing the greatest flexibility with f-stops, amount of available light, and other physical parameters. The settings described are optimized for the camera used, and other settings can be used, with that consideration in mind.

FIG. 1 also shows suggested ranges of shutter angle for wide (90° to 180°), medium (180° to 270°) and close-up (270° to 358°) shots. These suggested ranges do not preclude the use of any other shutter angle to produce the specific amount of imparted motion blur desired by the producer of the motion picture.

Figure 2:
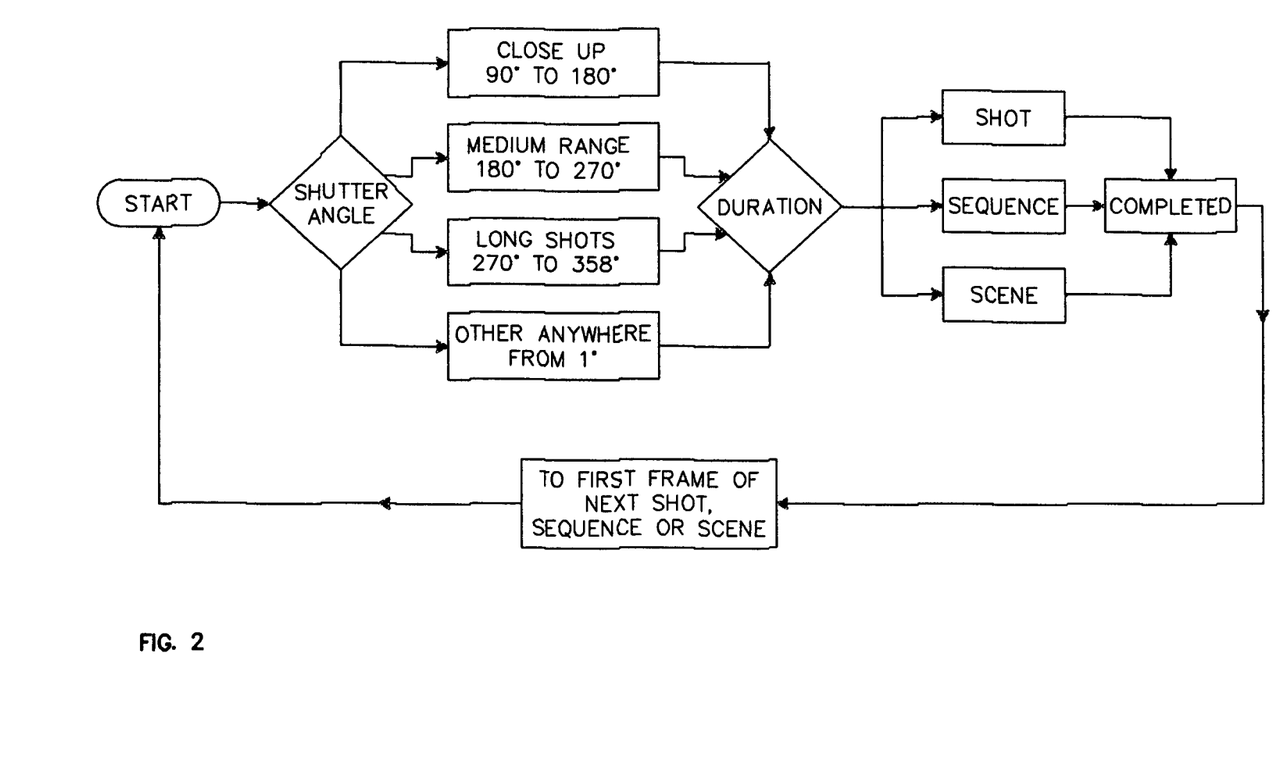

FIG. 2 shows how the method described expands the control of the user of the invention by allowing. him or her to add a precise amount of motion blur, to achieve a desired effect of improving, presentation quality. This improvement mitigates the "soap opera" appearance associated with live television. For the purpose of this explanation, the user imparts motion blur selectively to images as they are captured. In the preferred embodiment of the invention, they are photographed at forty-eight frames per second, using digital photography.

In the practice of the invention, the user starts at the beginning of a shot, sequence or scene to which a selected amount of motion blur will be added. This is done through the selection of the shutter angle when photographing the action that forms that particular portion of the motion picture, which is the user's first decision. The flow chart in Fig, 2 shows some of the preferred ranges of shutter angles for different types of shots: close-ups photographed at a shutter angle in the range of 90° to 180°, medium-range shots in the range of 180° to 270°, and wide-angle or "long" shots in the range of 270° to 358°. The shutter cannot be set to "fully open" at 360° because a brief separation between images is needed.

The next decision involves how long the user of the invention wishes to keep the shutter-angle setting in effect; whether for a shot, a sequence, or an entire scene. At the conclusion of that shot, sequence or scene, the user changes the setting of the shutter angle, and begins to photograph the next portion of the motion picture at another shutter-angle setting.

It should be noted that FIG. 2 only depicts the decisions available to the user, when when the invention is used for image-capture. This is done for simplicity. The invention can also be used in post-production for selectively adding motion blur to previously-photographed images, as desired, whether they are photographed on film or through digital means. There is an added feature in the post-production application of the invention. In addition to imparting motion blur for a shot, sequence or scene, it is also feasible to add motion blur to a single frame. In addition, portions or a single frame or a sequence of frames can singled out for the impartation of motion blur in post-production.

There are several ways to impart motion blur in the practice of this invention. Setting exposure duration as the equivalent to shutter angle to impart an optimal amount of motion blur for a scene or sequence, as described, is the preferred embodiment of the invention. However, other embodiments are possible, and each serves to prevent audience overload by modulating the amount of motion blur. This helps to mitigate the hyper-realism associated with high frame rates, as artifacts become minimized. Adding a controlled amount of the motion blur artifact helps to induce an amount of "suspension of disbelief" in the audience, which allows them to acknowledge that they are viewing a theatrical motion picture presentation. It is also possible to improve images incrementally, resulting in a level of quality that mitigates the artifact of hyper-realism to an optimal extent.

The optimal method for the practice of the invention described here is to impart motion blur when a motion picture is actually photographed, through use of different and appropriate shutter speeds. As an alternative, it is also feasible to add motion blur during post-production, on a scene-by-scene, or even a frame-by-frame, or component-by-component basis. It is also possible to select the motion of certain image components for special treatment in the practice of the invention. In that instance, motion blur is added during post-production. As mentioned previously, this can be accomplished by using digital devices calibrated like shutters that adjust shutter speed or angle to each frame, or by watching a scene or sequence from a motion picture and adding a specific amount of motion blur by digital means. As in the method based on photography, the amount of motion blur to be imparted depends on the action in the scene depicted. The object remains the same: to generate the precise amount of motion blur that will optimize the comfort and perception of reality as seen by the viewers of the motion picture.

In post-production, computer programs known as Kronos and its plugin, MotionBlur, produced by The Foundary Visionmongers, Ltd., which were developed for special effects, are suitable. The primary purpose of these programs is producing special effects, and this invention provides a new application for that software.

The embodiments described should be thought of as illustrative and not limiting. Other embodiments are possible, and they should be thought of as lying within the scope of the invention.

The invention claimed is:

1. A method for variably and selectably imparting a perception of motion blur to images or sequences in a high frame rate (HFR) motion picture, said blur introduced either at a time said motion picture images are photographed or during post production, said method comprising the steps of:
   (a) photographing frames and images defining said motion picture on film or by digital means at a frame rate of at least 48 frames per second;
   (b) processing from the said images;
   (c) imparting to frames of said motion picture images a perception of motion blur, a degree thereof provided by selection of a specific shutter angle or shutter speed for media selected from the group consisting essentially of each frame, each series of frames, each shot, each scene, or each sequence of frames, including frames of said motion picture in which the degree of imparted illusion of motion blur constitutes a variable within the creative discretion of the producer of the motion picture; and
   (d) displaying said images to a motion picture audience at the same frame rate at which they were taken in said Step (a) above, whereby the amount of motion blur imparted is sufficient to mitigate unnecessarily detailed temporal resolution effects otherwise delivered to viewers of the motion pictures.

2. The method as in claim 1, in which said imparting Step (c) further comprises: imparting a degree of motion blur to one of said scenes or sequences which varies from that imparted to another scene or sequence.

3. The method as in claim 2, in which a specific shutter speed is selected for a specific scene or sequence, depending on the type of shot desired, thereby imparting more motion blur for certain types of shots than for other types of shots.

4. The method as in claim 2, in which the amount of motion blur that can be imparted comprises a continuous variable, over the range of shutter speeds equivalent to shutter angles from that approaching a fully-open shutter to that which is so acute as to only permit enough light to be captured to allow for the scene or sequence to be photographed.

5. The method as recited in claim 1, in which a shutter angle of about 90 degrees to 180 degrees lends itself to sharp images of high dynamic range; in which shutter angles of about 180 degrees to 270 degrees are suitable for medium range images, and shutter angles of about 270 degrees to about 358 degrees are suitable for close-ups with action therein.

6. The method as in claim 1, in which said imparting step (c) includes the step of: imparting said motion blur during post production through digital means which comprise using motion picture images previously photographed at a high frame rate (HFR) and preparing such images for exhibition in motion-picture theaters at said frame rate, wherein said preparing includes imparting a selected amount of motion blur into each frame, sequence of frames or scene, said motion blur imparted by selecting the shutter speed at which each of said images is treated in post-production.

7. A method of production of a motion picture for exhibition to audiences, the production including: photography and post-production including digital manipulation of images photographed and exhibition of said motion pictures, in which the improvement comprises the step of: selectably imparting an amount of motion blur to each frame, series of frames, shot, scene or sequence within said motion picture, or none of said frames, said amount of blur provided at the creative discretion of the producer of the motion picture, and where said amount of motion blur is imparted during photographing each of said frames or by treating each of said frames during post-production at a shutter angle or shutter speed chosen to impart said amount of motion blur to each of said frames or series of thereof.

8. A method for variably and selectably imparting motion blur to motion picture images which are photographed at a high frame rate, for exhibition to audiences, in which a desired amount of motion blur is imparted to said images, comprising the steps of: (a) photographing said motion picture on film at a frame rate of at least forty-eight frames per second, (b) processing such images, (c) adding a pre-selected amount of motion blur to such images as desired as they are photographed or in post-production, and (d) exhibiting such images to motion picture audiences at the same frame rate at which they were photographed, whereby the images so exhibited contain said amount of motion blur necessary to mitigate an overly-detailed appearance of motion typically occurring at high frame rates, and said motion blur imparted on a frame-by-frame, shot-by-shot, or scene-by-scene basis by using a shutter angle or shutter speed to impart a creatively-desired amount of motion blur to each frame.

9. The method as recited in claim 8, in which a shutter angle of about 90 degrees to 180 degrees lends itself to sharp images of high dynamic range; in which shutter angles of about 180 degrees to 270 degrees are suitable for medium range images, and shutter angles of about 270 degrees to about 358 degrees are suitable for close-ups with action therein.

10. A method of producing a motion picture for exhibition to audiences, the production thereof including original photography and post-production inclusive of digital manipulation of images of frames in which the improvement comprises the step of: selectably imparting an amount of perceived motion blur to each frame, series of frames, shot, scene or sequence within said motion picture, the amount of motion blur provided at the artistic discretion of the producer, and further in which said amount of motion blur is imparted by treating each of said frames during post-production at an artistically selectable shutter angle.

11. A method of producing a motion picture for exhibition to audiences, the production thereof including original photography and post-production inclusive of digital manipulation of images of frames in which the improvement comprises the step of: selectably imparting an amount of perceived motion blur to each frame, series of frames, shot, scene or sequence within said motion picture, the amount of motion blur provided at the artistic discretion of the producer, and further in which said amount of motion blur is imparted by a selectable shutter speed corresponding to an artistically desirable amount of motion blur to each frame so processed.

* * * * *